C. G. CALO.

HORSE COLLAR.

No. 10,098. Reissued May 2, 1882.

WITNESSES:

C. Neveux

C. Sedgwick

INVENTOR:

C. G. Calo

BY Munn & Co

ATTORNEYS.

N. PETERS, Photo-Lithographer, Washington, D. C.

UNITED STATES PATENT OFFICE.

CHRISTOPHER G. CALO, OF ALBANY, NEW YORK.

HORSE-COLLAR.

SPECIFICATION forming part of Reissued Letters Patent No. 10,098, dated May 2, 1882.

Original No. 249,894, dated November 22, 1881. Application for reissue filed March 2, 1882.

*To all whom it may concern:*

Be it known that I, CHRISTOPHER G. CALO, of Albany, in the county of Albany and State of New York, have invented certain new and useful Improvements in Horse-Collars, of which the following is a full, clear, and exact description.

Reference is to be had to the accompanying drawings, forming part of this specification, in which similar letters of reference indicate corresponding parts in all the figures.

Figure 1:
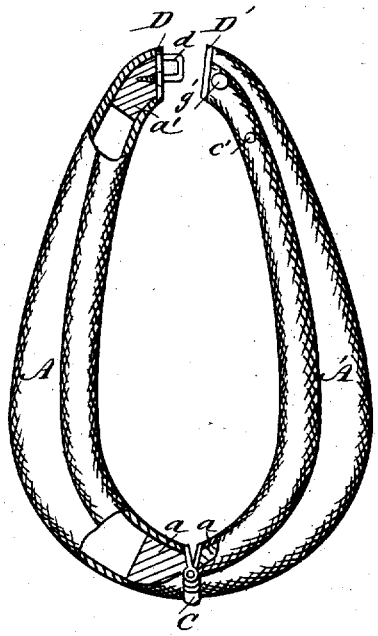
Figure 2:
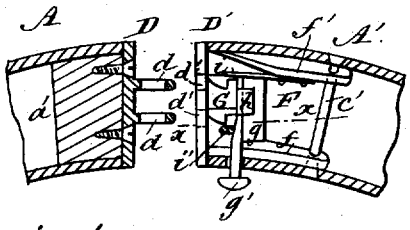
Figure 4:
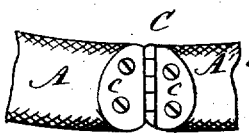
Figure 3:
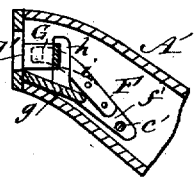

Figure 1 is a front elevation, partly in section, of a horse-collar constructed in accordance with the invention. Fig. 2 is a section of the upper ends of the collar, showing the locking device. Fig. 3 is a section taken on the line *x x* of Fig. 2; and Fig. 4 is an elevation of the lower ends of parts of the collar, showing the hinge applied thereto.

The invention consists in a horse-collar the body of which is hollow and made of paper, whereby an inexpensive horse-collar is produced which is both light and durable.

The invention also consists in a horse-collar the body of which is made hollow of paper-pulp or papier-maché in two sections or halves united by connecting devices which operate to admit of the opening and closing of the collar; and the invention furthermore consists in certain combinations, with the hollow sections which form the body of the collar, of certain connections for uniting, fastening, and re-enforcing said sections at their ends.

In the drawings the body of the collar is represented as made up of two parts, halves, or sections, A A′, which are hollow, and molded from papier-maché or paper-pulp mixed with some glutinous material. These body parts of the collar are formed by introducing the prepared pulp into a mold composed of a core built up of separate sections surrounded by a casing having such interior form as will give the proper thickness and exterior shape to the body parts or halves of the collar, the sections of the core being of such form and size as to be adapted to be withdrawn one by one from either end of the body parts of the collar after the pulp has become fixed. The body parts or shells of the hollow paper collar being obtained, the open ends of the part A and the lower end of the part A′ are stopped and re-enforced with plugs *a a′*, and to the plugs *a a* are secured by screws or similar means the plates *c c* of the hinge C, which hinge unites the body parts of the collar, as shown in the drawings.

To the plug *a′* is secured by screws or similar means a plate, D, which is provided with loops *d d*. These loops are adapted to enter corresponding slots, *d′ d′*, in the plate D′, which closes the upper end of the body part A′ of the collar. This plate D′ is secured to or made integral with a metal frame, F, which frame is secured in the upper end of the body part A′ by a rivet or bolt, *c′*, and serves (beside the purpose hereinafter mentioned) a similar purpose to that of the blocks *a* and *a′*—viz., that of supporting or re-enforcing the end of the shell or body part A′.

The frame F is composed of arms *f f′*, through the ends of which the bolt *c′* passes, and of a cross-plate, *g*, and riveted to the arm *f′* is a flat spring, *i*, and rising from the plate *g* is an upwardly-projecting arm, *h*, which is cut away from its face to hold and guide sliding catches G, which are adapted to retain the loops *d d* of the plate D when the upper ends of the body parts of the collar are brought together. The catches G are constantly held in the position shown in Fig. 2 against a stop, *i′*, which rises from the plate *g* in position to engage the loops *d d* by the spring *i*, except when forced forward against the tension of the spring by pressure upon a thumb-piece, *g′*, which protrudes from the collar in convenient position for unlocking the body parts of the collar when the same is to be removed from the horse's neck.

Instead of using the plugs *a a′* for closing and supporting the open ends of the hollow body parts of the collar, metal shells or thimbles of the proper size and shape, formed with the hinge-plates and with the loops *d*, may be used.

A horse-collar having its body made hollow and of paper is distinguishable from a solid paper collar by being lighter, stronger, and has an elasticity that will adapt itself to the shoulder of the horse, and is less liable to gall and chafe, and by constructing such collar with its body part in halves or sections, connected substantially as hereinbefore described, said collar can be easily and conveniently placed upon and removed from the horse without straining the light and hollow body of such collar.

Having thus fully described my invention, I claim as new and desire to secure by Letters Patent—

1. As an improved article of manufacture, a hollow sectional horse-collar made of paper-pulp or papier-maché, as described.

2. The body of a hollow paper-pulp horse-collar, made in sections connected to admit opening and closing the collar, as described.

3. The combination, with the hollow sections A A′, made of papier-maché, of the plugs *a a* and *a′* and the frame F, secured in the ends of the said sections, substantially as shown and described, whereby the ends of the said sections are re-enforced and provision is made for attaching the fastening devices, as set forth.

4. The combination, with the sections A A′, hinged together at their lower ends, and the plate D, provided with one or more loops, *d*, and secured to the upper end of the section A, of the frame F, the plate D′, having one or more slots, *d′*, the arms *f f′*, the plate *g*, the arm *h*, the spring *i*, the stop *i′*, and one or more catches, G, provided with a thumb-piece, *g′*, substantially as and for the purpose set forth.

CHRISTOPHER G. CALO.

Witnesses:

A. E. BATCHELDER,

WM. T. BOYD.